United States Patent [19]
Turner et al.

[11] 3,852,349
[45] Dec. 3, 1974

[54] REACTION OF PEROXIDES WITH NITRILES

[75] Inventors: John O. Turner, West Chester, Pa.; Richard V. Norton, Wilmington, Del.

[73] Assignee: Sun Ventures, Inc., St. Davis, Pa.

[22] Filed: Oct. 20, 1972

[21] Appl. No.: 299,508

Related U.S. Application Data

[63] Continuation-in-part of Ser. No. 144,345, May 17, 1971, abandoned.

[52] U.S. Cl...... 260/558 R, 260/561 R, 260/561 N, 260/558 D, 260/559 R
[51] Int. Cl............................................ C07c 103/08
[58] Field of Search ............. 260/558, 559, 561, 77

[56] References Cited
OTHER PUBLICATIONS

Vasnev et al., Acad. of Science, USSR Bulletin, Div. of Chem. Sciences, p. 1192–1197, 7 (1963).

*Primary Examiner*—Harry I. Moatz
*Attorney, Agent, or Firm*—George L. Church; Donald R. Johnson; Stanford M. Back

[57] ABSTRACT

N-alkyl amides may be formed by reacting aliphatic peroxides or hydroperoxides with aliphatic or aromatic nitriles in a solution of a strong acid and an alcohol.

10 Claims, No Drawings

REACTION OF PEROXIDES WITH NITRILES

CROSS REFERENCE TO RELATED APPLICATION

This application is a continuation-in-part of Ser. No. 144,345, filed May 17, 1971, by John O. Turner et al., now abandoned.

BACKGROUND OF THE INVENTION

This invention relates to a novel process for the preparation of N-alkyl amides. More particularly, this invention relates to a process for the preparation of N-alkyl amides by reacting an aliphatic peroxide or hydroperoxide with an aliphatic or aromatic nitrile in an acidic alcohol solution. This reaction, which produces N-alkyl amides in good yield, has not heretofore been reported or suggested by the prior art. The resulting N-alkyl amides, such as N-t-butyl amide, are useful as industrial solvents, selective polymer solvents, paint thinners and intermediates in the preparation of carboxylic acids and amines.

SUMMARY OF THE INVENTION

In accordance with the present invention, it has now been found that N-alkyl amides may be produced by reacting aliphatic peroxides or hydroperoxides with an aliphatic or aromatic nitrile as shown by the following reaction schemes:

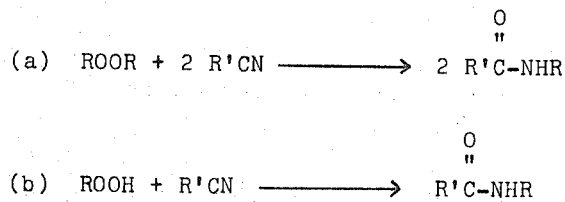

wherein R may be a secondary or tertiary aliphatic or alicyclic group having from 3 to 12 carbon atoms, such as sec.-butyl, t-butyl, 2-pentyl, t-pentyl, 1-methylcyclopentyl, 1-methylcyclohexyl and the like; and R' is an alkyl, alkenyl, aryl or aralkyl group having from 1 to 20 carbon atoms. It will be understood that, if desired, the aryl groups may contain one or more substituents which are inert to the reaction conditions employed, as for example hydroxy; nitro; mercapto; lower alkoxy, e.g. methoxy, ethoxy, and the like; lower alkyl, e.g. methyl, ethyl, n-propyl, iso-propyl, n-hexyl and the like; or halo groups, i.e., chloro, bromo, iodo, or fluoro. Where more than one inert substituent is present on an aryl group, it will be further understood that said groups may be the same or different.

The reaction is carried out in an alcoholic solution of a strong acid, as described in detail hereinbelow.

DESCRIPTION OF THE INVENTION

The process of this invention may conveniently be carried out by simply reacting the desired aliphatic peroxide or hydroperoxide with the desired nitrile in an alcoholic acid medium for about 4 to 25 hours, and preferably 6 to 16 hours, depending upon the nature of the starting materials, the concentration of the acid, etc, and thereafter recovering the resulting N-alkyl amide of the structural formula

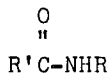

wherein R and R' are as defined above.

For optimum results, it is important that the ratios of the nitrile and peroxide starting materials, the acid and the selected alcohol be kept within certain ranges. Thus, the amount of alcohol should be present in a two to twelve-fold molar excess, based on the number of moles of starting materials, and preferably from about a three to eight-fold molar excess of the alcohol.

The amount of acid should, in turn, be based on the amount of alcohol present in order to provide a 30 to 65 weight percent concentration of acid based on the total weight of the acid/alcohol mixture. The preferred weight percent of acid is about 50 to 55 percent.

The acid employed should be a concentrated acid, as for example hydrochloric, phosphoric, polyphosphoric, sulfuric, perchloric, various sulfonic acids, such as sulfonic acid or p-toluene sulfonic acid, or the like, as well as acid-treated molecular sieves, and preferably sulfuric acid.

The alcohol is desirably an alkanol having from 1 to 10 carbon atoms. Of these, methanol is preferred. However, other alcohols may be employed, as for example, ethanol, propanol, butanol, pentanol, hexanol or the like.

The temperature employed in effecting this reaction should desirably be from about 10° to 80°C, and preferably is from 50° to 60°C.

As stated above, the hydroperoxides and peroxides employed as starting materials in this process include both aliphatic and alicyclic compounds which may contain from about 3 to 12 carbon atoms.

The hydroperoxides may be either secondary or tertiary compounds, although the latter type are more reactive and more effectively employed than are the secondary compounds. Typical amongst the aliphatic compounds which may be employed are such compounds as t-butylhydroperoxide, as well as such alicyclic compounds as 1-methylcyclopentyl or 1-methylcyclohexyl hydroperoxide or peroxide, or the like.

The nitriles of the formula R'CN, wherein R' is as defined above, include such compounds as acetonitrile, propiononitrile, benzonitrile, isovaleronitrile, crotononitrile, chlorocyanobenzene, methoxycyanobenzene, n-propyl-cyanobenzene, and the like.

As typical products of this process, there are obtained such N-alkyl amides as N-t-butylacetamide, N-t-pentylbenzamide, N-1-methylcyclopentylacetamide, chloro-N-t-butylbenzamide, methoxy-N-t-butylbenzamide, n-propy-N-t-butylbenzamide, and the like. In the case where unsaturated nitriles such as acrylonitrile and methacrylonitrile are employed, however, it has been found that in addition to the desired N-alkyl amides, there is also produced a polymeric product containing both polyamides and polynitriles.

The mole ratio of peroxide to nitrile is desirably 1:2, as shown in reaction scheme (a) above, while the ratio of hydroperoxide to nitrile is desirably 1:1, as evidenced by reaction scheme (b) above. However, it will be evident that these ratios are not critical and may be varied, depending upon the nature of the starting materials selected.

The following examples are illustrative of this invention. In these examples, all reactions were carried out by adding the organic peroxide or hydroperoxide dropwise with stirring to a solution of alcoholic acid (or aqueous acid) and nitrile in a three-necked round bottom flask. After stirring at the desired temperature for the specified time, the reaction mixture was poured over wet ice. In some cases a solid no precipitate formed. In these cases the aqueous solution was neutralized with sodium carbonate, extracted with ether, dried over potassium carbonate and upon evaporation a solid product was obtained. The alkyl amides were recrystallized from n-hexane.

EXAMPLE 1

According to the general procedure, 7.4 gm (0.05 m) of di-t-butyl peroxide is added to a solution containing 4.1 gm (0.1 mole) of acetonitrile in 20.2 gm of 50 percent methanolic sulfuric acid. Work up according to the general procedure yields 9.2 gm (0.08 mole) of N-t-butyl acetamide.

EXAMPLE 2

In accordance with the procedure of Example 1, 10.4 gm (0.1 m) of t-pentylhydroperoxide and 4.1 g (0.1 mole) of acetonitrile yields 0.071 moles of N-t-pentyl acetamide.

EXAMPLE 3

In accordance with the procedures of Example 1, but substituting 2-chloro-1-cyanobenzene for acetonitrile, there is obtained 2-chloro-N-t-butylbenzamide.

EXAMPLE 4

In accordance with the procedures of Example 1, but substituting 4-methoxy-1-cyanobenzene for acetonitrile, there is obtained 4-methoxy-N-t-butylbenzamide.

EXAMPLE 5

In accordance with the procedures of Example 1, but substituting 4-n-propyl-1-cyanobenzene for acetamide, there is obtained 4-n-propyl-N-t-butylbenzamide.

EXAMPLE 6

In accordance with the procedure of Example 1, 9.0 g (0.1 m) of t-butylhydroperoxide and 10.3 g (0.1 m) of benzonitrile yields 0.051 moles of N-t-butyl benzamide.

EXAMPLE 7

In accordance with the procedure of Example 1, 50 grams of p-toluene sulfonic acid in 50 grams of methanol as the acid yields 0.042 moles of N-t-butyl acetamide.

EXAMPLE 8

The procedure of Example 1 carried out in 50 percent weight ethanolic sulfuric acid yields 0.073 moles of N-t-butyl acetamide.

EXAMPLE 9

In accordance with the procedure of Example 1, 5.8 g (0.1 moles) of 1-methylcyclopentyl hydroperoxide, yields 0.063 moles of N-1-methylcyclopentyl acetamide.

What is claimed is:

1. A process for the preparation of an N-alkyl amide of the formula

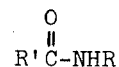

wherein R is a secondary or tertiary aliphatic or alicyclic group having from 3 to 12 carbon atoms and R' is an alkyl, alkenyl, aryl or aralkyl group having from 1 to 20 carbon atoms, and wherein the aryl group may be unsubstituted or substituted with substituents which are inert to the conditions of the reaction, said inert substituents comprising hydroxy, nitro, mercapto, lower alkoxy, lower alkyl, and halo groups, which comprises reacting a nitrile of the formula R'CN with a peroxide compound of the formula ROOR or ROOH, wherein R and R' are as defined above, in an alkanol-acid medium, wherein said acid is a mineral acid, sulfonic acid, p-toluene sulfonic acid, or an acid-treated molecular sieve, at a temperature in the range of from about 10° to 80°C.

2. The process according to claim 1 wherein the acid concentration is from about 30 to 65 weight percent based on the weight of the acid-alkanol mixture.

3. The process according to claim 1 wherein the acid concentration is from about 50 to 55 weight percent based on the weight of the acid-alkanol mixture.

4. The process according to claim 1 wherein the alkanol is a lower alkanol having from 1 to 4 carbon atoms.

5. The process according to claim 4 wherein the alkanol is methanol.

6. The process according to claim 1 wherein the acid is sulfuric acid.

7. The process according to claim 1 wherein the alkanol is present in a molar excess of at least twice the combined number of moles of peroxide and nitrile starting material.

8. The process according to claim 1 wherein the reaction temperature is from about 50° to 60°C.

9. The process according to claim 1 wherein the peroxide compound is a hydroperoxide, and the molar ratio of said hydroperoxide to nitrile starting material is about 1:1.

10. The process according to claim 1 wherein the peroxide compound is a peroxide, and the molar ratio of said peroxide to nitrile starting material is about 1:2.

* * * * *